United States Patent [19]

Canter

[11] 4,285,583

[45] Aug. 25, 1981

[54] PHOTOMETRIC DEVICE

[75] Inventor: Joseph M. Canter, Lexington, Mass.

[73] Assignee: Polaroid Corporation, Cambridge, Mass.

[21] Appl. No.: 93,261

[22] Filed: Nov. 13, 1979

[51] Int. Cl.³ .............................................. G03B 7/093
[52] U.S. Cl. .................................... 354/23 D; 354/31; 354/51
[58] Field of Search ................... 354/31, 50, 51, 23 D; 250/209, 214 P; 356/222; 355/68; 361/176, 177

[56] References Cited

U.S. PATENT DOCUMENTS

| | | | |
|---|---|---|---|
| Re. 28,025 | 5/1974 | Murata et al. | 354/31 |
| 3,310,679 | 3/1967 | Babish | 250/209 |
| 3,448,274 | 6/1969 | Altman | 250/209 |
| 3,511,142 | 5/1970 | Biber | 354/31 |
| 3,529,523 | 9/1970 | Haskell | 354/31 |
| 3,545,350 | 12/1970 | Gross | 354/31 |
| 3,563,143 | 2/1971 | Petersen | 354/31 |
| 3,714,442 | 1/1973 | Frank | 250/209 |
| 3,717,077 | 2/1973 | Harvey | 354/31 |
| 3,741,088 | 6/1973 | Nobushawa | 354/31 |
| 3,772,517 | 11/1973 | Smith | 250/209 |
| 3,797,941 | 3/1974 | Staes | 250/214 P X |
| 3,836,920 | 9/1974 | Uchiyama et al. | 354/27 |
| 3,884,584 | 5/1975 | Tsunekawa et al. | 250/214 P X |
| 3,945,732 | 3/1976 | Nobushawa | 356/222 |
| 3,971,046 | 7/1976 | Nobushawa | 354/31 X |
| 4,005,444 | 1/1977 | Uchiyama et al. | 354/27 |
| 4,162,831 | 7/1979 | Gold | 354/31 |

OTHER PUBLICATIONS

"The Theory of the Multicell Exposure Meter", Photographic Science and Engineering, vol. 6, No. 3, May–Jun. 1962.

Primary Examiner—L. T. Hix
Assistant Examiner—William B. Perkey
Attorney, Agent, or Firm—Edward S. Roman

[57] ABSTRACT

A photometric device for determining the exposure interval for a scene to be photographed includes a photometric array having a plurality of individual photocells that are each adapted to receive light reflected from a selected portion of the scene. Each photocell provides a signal output that is proportional to the light from the scene incident upon the cell. The outputs are each time integrated from the initiation of the exposure interval with the integrated results compared to a predetermined value representative of the desired exposure parameters for the film. A logic array terminates the exposure interval when a majority or median number of the time-integrated results indicate that the film exposure parameters for the respective portions of the scene have been met. The exposure interval is advantageously determined as a function of the median value of the light reflected from the scene rather than the average value and the exposure interval is thereby less affected by extreme variations in brightness.

16 Claims, 12 Drawing Figures

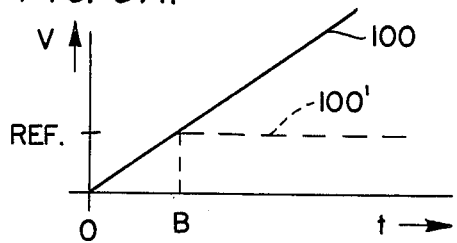
FIG. 3A.
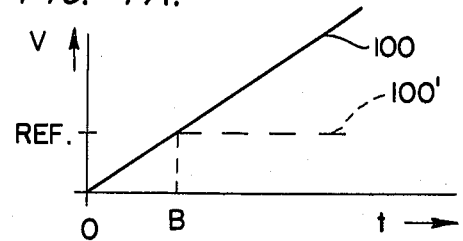
FIG. 4A.
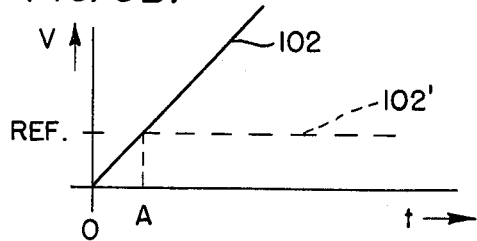
FIG. 3B.
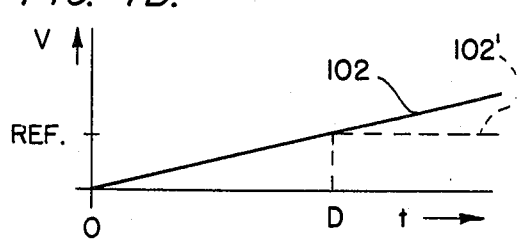
FIG. 4B.
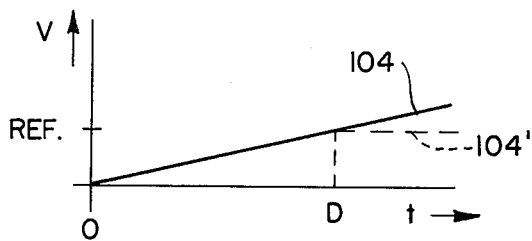
FIG. 3C.
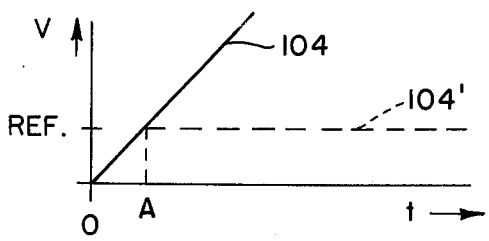
FIG. 4C.
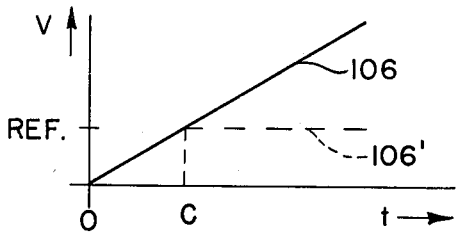
FIG. 3D.
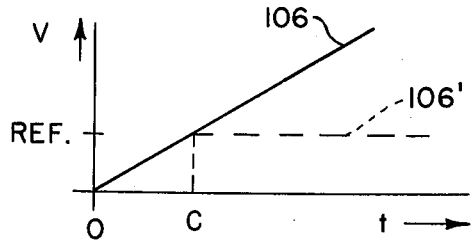
FIG. 4D.
FIG. 3E.
| GATE TERMINAL | T=0 | T=$T_A$ | T=$T_B$ | T=$T_C$ |
|---|---|---|---|---|
| T1 (C) | 0 | 0 | 1 | 1 |
| T3 (BG) | 0 | 1 | 1 | 1 |
| T4 (FG) | 0 | 0 | 0 | 0 |
| T5 ($S_1, S_2$) | 0 | 0 | 0 | 1 |
FIG. 4E.
| GATE TERMINAL | T=0 | T=$T_A$ | T=$T_B$ |
|---|---|---|---|
| T1 (C) | 0 | 0 | 1 |
| T2 (C) | 0 | 0 | 1 |
| T3 (BG) | 0 | 0 | 0 |
| T4 (FG) | 0 | 1 | 1 |
| T5 ($S_1, S_2$) | 0 | 0 | 0 |

PHOTOMETRIC DEVICE

BACKGROUND OF THE INVENTION

The present invention relates to photometric devices for determining the exposure interval for a scene to be photographed and, more particularly, to photometric devices which determine the duration of the exposure interval as a function of the median value of the light reflected from the scene.

Typical photometric devices for measuring the light reflected from a scene to be photographed include a photo-responsive cell that produces an electrical output in response to the average or mean value of the illuminance received from the scene. These types of photometric devices generally produce accurate exposure interval determinations when the distribution in illuminance from the different portions of the scene is relatively narrow with the accuracy of the exposure interval determination diminishing as the illuminance distribution increases. For example, in photographing a generally dark evening scene by available light, the accuracy of the exposure interval determination made by the aforementioned averaging type photocells is generally degraded by the presence of a bright point-source of illumination that causes the exposure interval determination for the scene as a whole to be shorter than that desired from an artistic standpoint.

More sophisticated photometers have been developed in an effort to obtain more accurate exposure interval determinations under widely varying scene illumination. These photometers have included multi-cell photo-responsive arrays of various arrangements and other arrangements in which a photocell is positioned to receive the light reflected from the probable subject of primary interest in the central portion of the scene to be photographed and another photocell positioned to receive light from the probable subjects of secondary interest in the peripheral portions of the scene. Electronic circuitry is provided to select one or the other of the photocells or correct the exposure determination of one of the photocells as a function of the output of the other of the cells in an effort to provide more accurate exposure interval determinations. While the multi-cell photometers generally achieve their intended goal, the exposure interval determination is characteristically based upon and is a function of the average light received from the scene.

In view of the above, the present invention provides a photometric device for providing an exposure interval determination for a scene to be photographed as a function of the median value of the light reflected from the scene. A photo-responsive array is provided having a plurality of photocells that are each adapted to receive light reflected from selected portions of the scene to be photographed with each photocell providing an electrical output that is responsive to the light incident thereon. The output of each photo-responsive cell is time integrated with the integrated result for each photocell compared to a predetermined exposure value based upon the exposure parameters of the film (e.g. film speed and aperture opening). The exposure interval is terminated when a predetermined number of time-integrated results, namely, a majority, meets or exceeds the desired exposure parameters for the film.

A photometer in accordance with the preferred embodiment includes a photo-responsive array having a plurality of photocells including a photocell for receiving the light reflected from the probable subject of primary interest in the central portion of the scene and photocells for receiving the light reflected from the subjects of secondary interest in, respectively, the background portion, the foreground portion, and the lateral side portions of the scene to be photographed with each cell providing a photo-current output responsive to the light incident thereon. The output of each photo-responsive cell is time-integrated by a combined integrator/logic device which provides a binary zero output for a time period inversely proportional to the illuminance incident on its respective photocell. When the time-integrated result for each photocell meets or exceeds an exposure parameter value that indicates proper exposure for the film exposure parameters, the combined integrator/logic device for that photocell provides a binary one output. A majority gate logic operator coupled to the integrator/logic devices terminates the exposure interval when a median number or majority of the logic device outputs are binary one.

Preferably, the response of the photo array is adjusted to center-weight the array in favor of the central photocell to enhance the probability of proper exposure of the subject of primary interest in the central portion of the scene.

The principal object of the present invention is to provide a photometric device that advantageously determines an exposure interval that is based upon and a function of the median value of the light reflected from the scene to be photographed so that the exposure interval determination is less adversely affected by scene illuminances having distributions far above or far below the average scene illuminance. Other objects of the present invention include providing a photometric device for cameras in which the exposure interval determination is made prior to film exposure, for cameras having time-integrating exposure systems in which the exposure interval determination is made during the exposure interval, and for stand-alone photometers or exposure meters.

BRIEF DESCRIPTION OF THE FIGURES

FIGS. 3A–3D are idealized graphical illustrations showing the operation of the circuit of FIG. 2 for an exemplary scene to be photographed in which the ordinate represents voltage in arbitrary units and the abscissa represents time;

FIG. 3E is a function table summarizing the logic states of the circuit of FIG. 2 for the graphical illustrations of FIGS. 3A–3D;

FIGS. 4A–4D are idealized graphical illustrations, similar to those of FIGS. 3A–3D, showing the operation of the circuit of FIG. 2 for another exemplary scene to be photographed; and FIG. 4E is a function table summarizing the logic states of a modification of the circuit of FIG. 2 for the graphical illustrations of FIGS. 4A–4D.

DESCRIPTION OF THE PREFERRED EMBODIMENT

Figure 1:
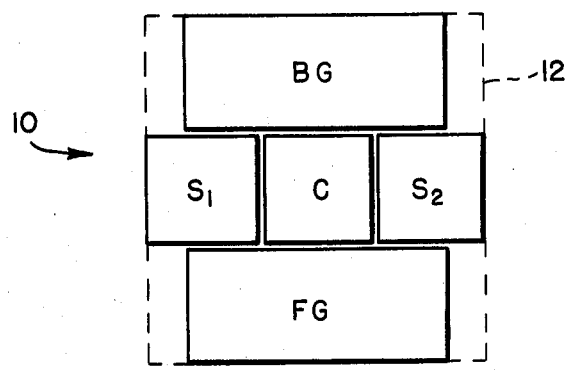
FIG. 1 is a frontal view of a photo-responsive array in accordance with the present invention which corresponds to the field of view of the scene to be photographed and includes a central portion for receiving light from the subject of principal interest in the central portion of the scene; and a background portion, a foreground portion, and lateral side portions for receiving the light reflected from the subjects of secondary interest.

A photometer in accordance with the present invention utilizes a photometric array 10 that includes a plurality of photo-responsive segments having the arrangement shown in FIG. 1. As shown therein, the array 10 includes a generally rectangular central segment C, upper and lower segments BG and FG, and side or lateral segments $S_1$ and $S_2$. The upper segment BG encloses or circumscribes an area above the central segment C and extends laterally outward from both sides of the central segment C with the lower segment FG symmetrically formed relative to the upper segment BG, that is, the lower segment FG encloses or circumscribes an area below the central segment C and extends laterally outward from both sides of the central segment. The lateral segments $S_1$ and $S_2$ are located on opposite sides of the central segment C between the upper and lower segments BG and FG. The field of view of the entire photometric array 10 generally corresponds to that of the film format of the camera as indicated by the broken-line rectangle 12 in FIG. 1. In the preferred embodiment of the photometric array 10, the extreme lateral side portions of the upper and lower segments BG and FG do not extend outward to correspond with the lateral limits of the film format 12. As a result, the photometric array 10 effectively ignores illumination from the extreme upper and lower corners of the scene to be photographed. If desired, the upper and lower segments BG and FG can be extended laterally outward to correspond with the entire film format 12. The field of view subtended by the central segment C preferably occupies approximately 12% of the total field of view of the scene and is positioned to substantially correspond with and receive the light reflected from the probable subject of principal interest in the central portion of the scene. The upper and lower segments BG and FG, each subtend approximately 25% of the scene with the segments BG and FG being positioned to receive the light reflected, respectively, from the subjects of secondary interest in the background and foreground portions of the scene to be photographed. The lateral segments $S_1$ and $S_2$ each subtend approximately 12% of the remaining field of view with the segments $S_1$ and $S_2$ being positioned to receive the light reflected, respectively, from the subjects of secondary interest on either side of the subject of primary interest in the central portion of the scene.

The photometric array 10 may be formed from any one of a number of materials that change their electrical characteristics or are otherwise responsive to the amount of light incident thereon including photo-conductive cells and photo-voltaic cells. In the preferred embodiment, the photometric array 10 is formed by photo-responsive diode junctions on a substantially planar, unitary substrate with the various segments deposited or otherwise formed in place. In the alternative, the photometric array 10 can be formed from discrete elements that are located relative to one another to form the desired light-receiving array.

Figure 2:
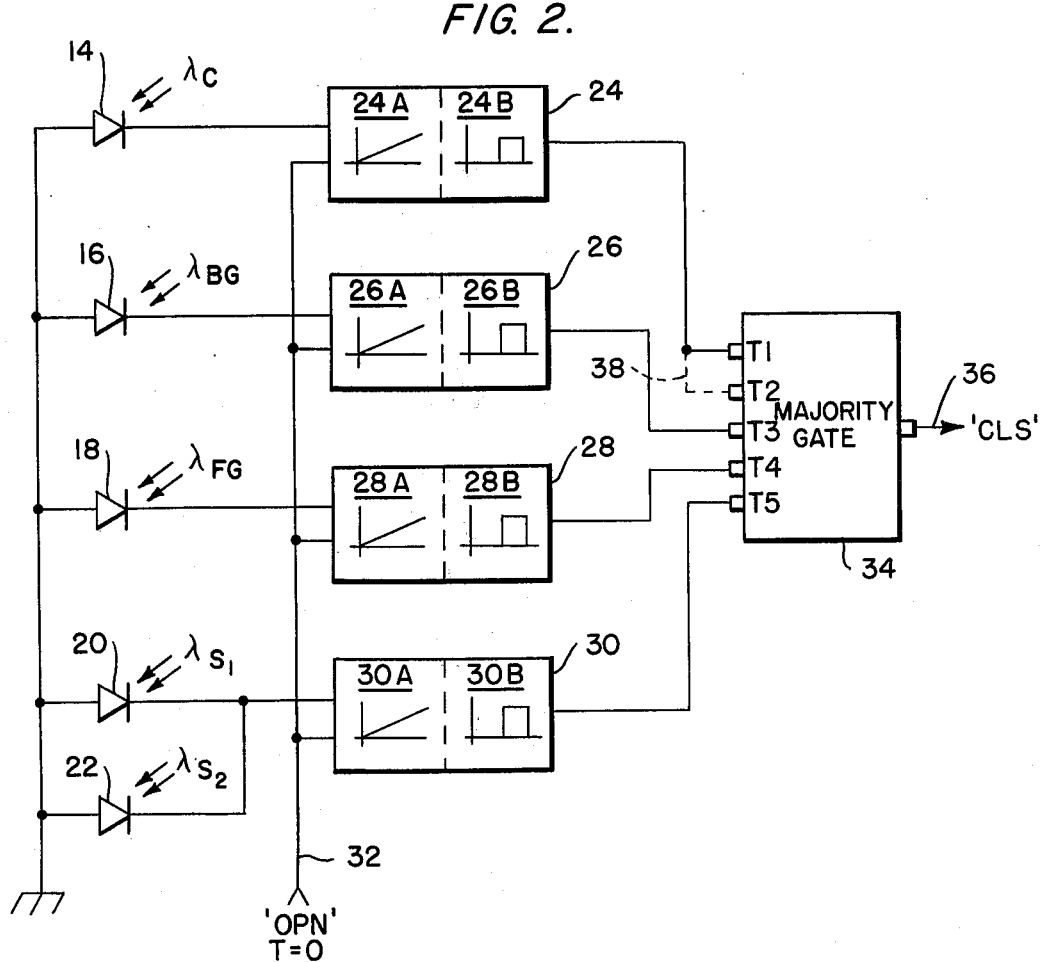
FIG. 2 is a schematic block diagram of an exposure interval determining circuit adapted to operate in cooperation with the photo-responsive array of FIG. 1.

The photometric array 10 may be used in combination with the circuitry of FIG. 2 to provide a film exposure determination for a camera that is more accurate over a wider range of brightnesses than those photometric devices which provide a film exposure determination based solely on the average illuminance reflected from the scene. In a camera application, the photometric array 10 is mounted in a photometer on the camera and the photometer is oriented in such a manner that its field of view is substantially equal to that of the film format 12 of the camera so that the central segment C receives the light reflected from the probable subject of principal interest in the central portion of the scene to be photographed, the upper and lower segments BG and FG receive the light reflected from, respectively, the background and foreground portions of the scene, and the lateral segments $S_1$ and $S_2$ receive the light reflected from the lateral portions of the scene.

In FIG. 2, photo diodes 14, 16, and 18 correspond, respectively, to the central, background and foreground segments C, BG, and FG of the photometric array 10 of FIG. 1 with the light incident upon the segments represented by the symbols $\lambda_C$ $\lambda_{BG}$ and $\lambda_{FG}$, respectively. The photo diodes 20 and 22 correspond, respectively, to the lateral portions $S_1$ and $S_2$ of the photometric array 10 with the light incident upon these segments represented by the symbols $\lambda_{S1}$ and $\lambda_{S2}$. The anodes of the various diodes are connected in common to a circuit ground and the cathodes of the diodes 14, 16, and 18 are connected to combined integrator/logic devices 24, 26, and 28. The cathodes of the diodes 20 and 22 are connected in parallel to a combined integrator/logic device 30.

Each of the combined integrator/logic devices 24, 26, 28, and 30 includes an integrator circuit 24A, 26A, 28A, and 30A that is adapted to provide a time increasing voltage output in response to the input signal provided from the respective photo diode(s) with the rate of increase of the time-integrated result dependent upon the illuminance incident on the respective diode(s). While not specifically shown, each of the integrator circuits 24A, 26A, 28A, and 30A may be fabricated from a linear operational amplifier having a capacitive impedance in its feedback circuit to provide an output which is proportional to the time integral of its input signal. Each of the integrator/logic devices include a logic device 24B, 26B, 28B, and 30B which is adapted to compare the time-integrated output of the respective diode(s) with a predetermined value that represents the exposure parameters (e.g. film speed, aperture opening) for the film and provide either a logic zero output or a logic one output as described more fully below. While not specifically shown, each logic device may be fabricated from a differential amplifier that has one input connected to the output of its respective integrator circuit and another input connected to a reference voltage source that represents the exposure parameters for the film for proper film exposure. The output of the differential amplifier may be connected to a pulse shaping device, such as a Schmidt trigger, that provides a logic zero output when the time-integrated output of the respective photo diodes is below the exposure parameter reference voltage and a logic one output when the time-integrated output of the photo diode is at or above the exposure parameter reference voltage to indicate that the light reflected from the respective portion of the scene to be photographed is sufficient to properly expose the respective portion of the film.

In the preferred embodiment, the operational characteristics of the integrator circuits 24A, 26A, 28A, and 30A are adjusted so that their outputs are substantially the same for the same average illumination reflected from the scene. Since the area of the scene subtended by the central segment C (approximately 12%) is less than that subtended by each of the background and foreground segments BG and FG (25%) and less than the combined area of the lateral segments $S_1$ and $S_2$ (approximately 25%), the adjustment of the integrators 24A, 26A, 28A, and 30A to provide equal output for the same average illuminance has the effect of center-weighting the photometric array 10. While this center-weighted aspect is preferred, it can be eliminated or modified by appropriate adjustment of the operating characteristics of one or more of the various integrator circuits.

The various integrator/logic devices are controlled by an appropriate signal on control line 32 with the integrator circuits 24A, 26A, 28A, and 30A held in a reset state and the logic devices 24B, 26B, 28B and 30B held at logic zero prior to the initiation of the exposure interval and enabled for operation when a shutter open command 'OPN' is applied to the control line 32 at time T=0.

A majority logic operator or gate 34, which includes a plurality of "vote"-receiving input terminals T1, T2, T3, T4, and T5 is coupled to the integrator/logic devices 24, 26, 28, and 30 and is designed to test the outputs of the devices and provide a logic zero output on its output line 36 when less than a majority of the outputs of the integrator/logic devices are logic zero and provide a logic one output on its output line, which latter output constitutes a shutter close command 'CLS', when a majority of its inputs are logic one, indicating that the light incident on a majority of the photo diodes is at least sufficient to provide proper exposure for a majority of the corresponding surface areas of the film.

While the output of each integrator/logic device 24, 26, 28, and 30 may be connected to one of the input terminals of the majority gate 34, the output of the center segment C may be given two votes, as indicated by the connection 38 (broken-line illustration) between terminals T1 and T2 of the majority gate 34 in FIG. 2 to further center weight the photo array 10 in favor of the central segment C.

The majority gate 34 may be fabricated from various circuit designs including a multi-input logic array that provides the desired logic one output when a majority of its inputs are at a logic one level, a cyclicly operated multiplexer that periodically samples each of its inputs and gates the sampled input to a resettable counter/comparator circuit that provides the desired logic one output command 'CLS' when a majority of the multiplexer inputs are logic one, or a firmware controlled micro-computer that cyclicly accesses the logic inputs and determines when a majority of the inputs are at a logic one state. As can be appreciated by those skilled in the art, the logic state assignments for the circuit of FIG. 2 are entirely arbitrary.

The operation of the circuit of FIG. 2 in combination with the photometric array 10 of FIG. 1 can best be appreciated by reference to the following two examples illustrated respectively in FIGS. 3A–3E and FIGS. 4A–4E. The solid line and broken-line plots of these figures represent the output of the various integrator circuits and logic devices, as described more fully below, in which the ordinates represent volts in an arbitrary scale and the abscissas represent time. The function tables of FIGS. 3E and 4E summarized the operation of the circuit of FIG. 2 based upon the plots of, respectively, FIGS. 3A–3D and FIGS. 4A–4D with the left hand column of each table listing the terminal numbers of the majority gate 34 and the top row identifying selected time points during the exposure interval.

In the examples of FIGS. 3A–3C, the straight line plots 100, 102, 104 represent the time-integrated outputs, respectively, of the photo diodes 14, 16, and 18 from the integrator circuits 24A, 26A, and 28A corresponding to the central, background, and foreground portions of the scene to be photographed. The plot 106 of FIG. 3D represents the time-integrated outputs of the photo diodes 20 and 22 from the integrator 30A corresponding to the lateral portions of the scene. The slope of the respective plots indicates the relative illuminance of the light incident on the respective photo diode(s). Of the various plots, the plot 102 of FIG. 3B has the greatest slope and indicates that the background portion of the scene is the most brightly illuminated part of the scene, and the plot 104 of FIG. 3C has the least slope and indicates that the foreground portion of the scene is the most darkly illuminated part of the scene. The plot 100, which represents the subject of probable interest in the central portion of the scene, has a slope less than that of the background plot 102 but greater than that of the foreground plot 104 indicating that the illuminance of the central portion falls between that of the foreground and background portions, and the plot 106 has a slope somewhat less than that of the plot 100 for the central portion of the scene indicating that the lateral side portions of the scene $S_1$ and $S_2$ are somewhat less brightly illuminated than the central portion though more brightly illuminated than the foreground portion.

In FIGS. 3A–3D, the step functions 100', 102', 104', and 106' shown in broken-line illustration represent the logic state output of the respective logic devices 24B, 26B, 28B, and 30B with these step functions superimposed on their associated or corresponding time-integrated plots. In this example, the outputs of the logic devices 24B, 26B, 28B, and 30B are connected to input terminals T1, T3, T4, and T5 of the majority gate 34 (terminal T2 is not used) so that each logic device has one "vote." The logic states at the output of the devices 24B, 26B, 28B, and 30B and their corresponding input terminals T1, T3, T4, and T5 of the majority gate 34 change from a logic zero to a logic one state when the time-integrated output of the respective photo diode(s) exceeds a reference voltage (as indicated on the ordinates) with the reference voltage based upon the exposure parameters of the film (film speed and aperture opening) and representative of the desired film exposure. Thus, when the time-integrated output of the photo diode(s) indicated by the various straight line plots in FIGS. 3A–3D equals or exceeds the reference voltage value to indicate that the exposure parameters for the corresponding portion of the film have been met, the output of the associated logic device and the corresponding input terminal to the majority gate 34 goes to the logic one level. The time at which the logic device makes the transition from logic zero to logic one is dependent upon the slope of the respective time-integrated outputs of the photo diode(s) and, of course, the illuminance from the scene incident on the respective photo diode(s).

As shown in the function table of FIG. 3F, when the shutter is open to initiate the exposure interval at time T=0, the integrators 24A, 26A, 28A, and 30A in response to the open shutter command 'OPN' on the control line 32 begin integrating the output of their respective photo diode(s) with the time-integrated result increasing at a rate that is a function of the illuminance on the respective photo diode(s). Since, in this example, the background portion of the scene to be photographed is the most brightly illuminated portion of the scene, the time-integrated result of the output of the photo diode 16 from integrator 26A is the first to exceed the reference voltage value with the output of the corresponding logic device 26B and the associated terminal T3 of the majority gate 34 changing from logic zero to logic one at time $T=T_A$ with the output of the remaining logic devices remaining at logic zero as indicated in the function table of FIG. 3E. Since the central portion of the scene to be photographed is the next most brightly illuminated portion of the scene, the output of the corresponding logic device 24B and the associated terminal T1 of the majority gate 34 will change from a logic zero to a logic one at time $T=T_B$. Thereafter, the time-integrated result of the lateral side portions $S_1$ and $S_2$ will exceed their reference value at time $T=T_C$ to cause the output of logic device 30B and the associated terminal T5 of the majority gate 34 to go to the logic one state. At this point (time $T=T_c$), a majority of the majority gate 34 inputs (that is, terminals $T_1$, $T_3$, and $T_5$) are at logic one and the majority gate 34 will then issue a shutter close command 'CLS' on line 36 to terminate the exposure interval at time $T=T_c$.

In the example of FIGS. 4A–4D, the illumination of the scene to be photographed is identical to that of the example of FIGS. 3A–3D except that the illuminances of the background and foreground portions in FIG. 4B and FIG. 4C have been interchanged with those of FIG. 3B and FIG. 3C and the output of the logic device 24B is connected to terminals T1 and T2 of the majority gate 34 (as shown by the broken-line connection 38 between these two terminals in FIG. 2) to further center-weight the output of the photo diode 14 by giving it two "votes" rather than one as in the example of FIGS. 3A–3E.

Since the foreground portion of the scene is the most brightly illuminated in this second example, the output of the logic device 28B and the associated terminal T4 of the majority gate 34 will change from a logic zero to a logic one state at time $T=T_A$. Thereafter, the output of the logic device 24B and the associated terminals $T_1$ and $T_2$ of the majority gate 34 change from a logic zero to a logic one state (since the central portion of the scene to be photographed is the second most brightly illuminated portion of the scene) at time $T=T_B$. Since, at time $T=T_B$, a majority of the majority gate 34 inputs are at a logic one level (specifically terminals $T_1$, $T_2$, and $T_3$) the majority gate 34 will issue a close shutter command 'CLS' on its output line 36 at time $T=T_B$, to terminate the film exposure interval. By center-weighting the photometric array 10 in favor of the central portion of the scene to be photographed, the probability that the subject of primary interest in the central portion will be properly exposed increases to thereby further assure an accurate exposure interval for the film.

As can be appreciated by those skilled in the art, the invention is not limited to the preferred embodiment described above. For example, the photometric array 10 can be formed as a rectangular matrix m having i rows and j columns in which each photo-responsive segment $a_{ij}$ is coupled to a corresponding integrator/logic device which in turn is coupled to a majority gate having $i \times j$ or more inputs. Various of the photo-responsive segments $a_{ij}$ can be configured by connection to a one or more of the inputs of the majority gate, to increase the weighted value of their outputs. In addition, the majority gate can be configured so that the termination of the exposure interval need not be effected when a majority or median number (that is the fiftieth percentile) of the inputs indicate proper exposure but can also be configured for some other percentile of the inputs.

A photometric device fabricated in accordance with the present invention advantageously provides a photometer for determining an exposure interval based on the median value of the light reflected from the scene to be photographed rather than the average value and is thus less affected by brightness levels far above the average scene brightness. The brightest light reflected from the scene will control the timing of the first vote but the less bright portions of the scene will control the ultimate duration of the exposure interval. Thus, in the example of FIGS. 3A–3D, the most brightly illuminated background portion of the scene (FIG. 3B) causes the first vote to occur at time $T=T_A$. If the illuminance of the background portion were increased toward an unbounded upper limit (causing the slope of the plot 102 in FIG. 3B to increase toward the vertical) the timing of the first vote would approach time $T=0$. However, the ultimate timing of the duration of the exposure interval would still be determined by the less brightly illuminated portion of the scene. In contrast, a very brightly illuminated portion of a scene would dominate an averaging type photometer throughout the entire exposure interval determination to provide a shorter exposure interval than generally desired from an artistic standpoint.

As will be apparent to those skilled in the art, various changes and modifications may be made to the photometric device in accordance with the present invention without departing from the spirit and scope of the invention as recited in the appended claims and their legal equivalent.

What is claimed is:

1. A photometric device for determining the exposure interval for a scene to be photographed, said photometric device comprising:

a photometric array including a plurality of photo-responsive cells each for receiving light reflected from a selected portion of a scene to be photographed and each providing an electrical output responsive to the light incident thereon; and an electronic means coupled to said photo-responsive cells for, upon initiation of the exposure interval, integrating the output of each cell to provide an integrated output for each cell and for subsequently terminating said exposure interval when a predetermined percentage of said so-integrated outputs meet or exceed a predetermined film exposure value.

2. The photometric device claimed in claim 1 wherein:

said photometric array includes a first photocell for receiving at least a portion of the light reflected from the central portion of the scene to be photographed;

a second photocell for receiving at least a portion of the light reflected from a background portion of the scene to be photographed;

a third photocell for receiving at least a portion of the light reflected from the foreground portion of the scene to be photographed; and a fourth photocell means for receiving at least a portion of the light reflected from the lateral side portions of the scene to be photographed.

3. The photometric device claimed in claim 2 wherein:
said first, second, third, and fourth photocells are defined by substantially planar photo diode junctions deposited on a unitary substrate.

4. The photometric device claimed in claim 2 wherein:
said first photocell is configured to receive approximately 12% of the light reflected from the scene and said second, third, and fourth photocells are configured to receive equal portions of the remaining light reflected from the scene to be photographed.

5. The photometric device claimed in claim 4 wherein said electronic means comprises:
integrator circuit means connected to each of said photo-responsive cells for integrating the output of each cell;
electronic indication means connected to each of said integrator circuits for providing an electronic output indication when the time integrated output of the respective photo-responsive cell meets the predetermined exposure value for the film; and
logic means connected to said indication means for providing an exposure interval termination signal when a predetermined percentage of said indication means indicate that the integrated outputs of the respective photo-responsive cells meet the predetermined exposure value.

6. The photometric device claimed in claim 5 wherein:
said predetermined percentage is the median percentile.

7. The photometric device claimed in claim 5 wherein:
said integrators are adjusted to provide an equal value output for the same illumination incident on each of said photocells to center-weight the photometric array.

8. The photometric device claimed in claim 1 wherein said electronic means comprises:
integrator circuit means connected to each of said photo-responsive cells for integrating the output of each cell;
electronic indication means connected to each of said integrator circuits to provide an electronic indication when the time integrated output of the respective photo-responsive cell meets a predetermined exposure value for the film; and
logic means connected to said indication means for providing an exposure interval termination signal when a predetermined percentage of said indication means indicate that the integrated outputs of the respective photo-responsive cells meet the predetermined exposure value.

9. The photometric device claimed in claim 8 wherein:
said predetermined percentage is the median percentile.

10. A photometric device for determining the exposure interval of a scene to be photographed, said photometric device comprising:
a photometric array including a plurality of photo-responsive cells each for receiving light reflected from a selected portion of a scene to be photographed and for providing an electrical output responsive to the light incident thereon;
first electronic means coupled to said photo-responsive cells for, upon initiation of the exposure interval, time integrating the output of each of said cells;
second electronic means coupled to said first electronic means for providing a logic level indication for each of said photocells, said second electronic means providing a first logic level indication when the so-integrated result for a photocell is below a predetermined film exposure value and providing a second logic level indication when the so-integrated result meets or exceeds the predetermined film exposure value; and
third electronic means coupled to said second electronic means for providing an exposure interval termination indication when a selected percentile of said second logic level indications are provided by said second electronic means.

11. The photometric device claimed in claim 10 wherein:
said photometric array includes a first photocell for receiving at least a portion of the light reflected from the central portion of the scene to be photographed;
a second photocell for receiving at least a portion of the light reflected from a background portion of the scene to be photographed;
a third photocell for receiving at least a portion of the light reflected from the foreground portion of the scene to be photographed; and
a fourth photocell means for receiving at least a portion of the light reflected from the lateral side portions of the scene to be photographed.

12. The photometric device claimed in claim 11 wherein:
said first, second, third, and fourth photocells are defined by substantially planar photo diode junctions deposited on a unitary substrate.

13. The photometric device claimed in claim 11 wherein:
said first photocell is configured to receive approximately 12% of the light reflected from the scene and said second, third, and fourth photocells are configured to receive equal portions of the remaining light reflected from the scene to be photographed.

14. The photometric device claimed in claim 11 wherein:
said predetermined percentage is the median percentile.

15. A method for operating a camera shutter to photograph a scene, said method comprising the steps of:
dividing the light reflected from the scene to be photographed into selected portions corresponding to selected portions of the scene;
opening the shutter to initiate the exposure interval;
measuring the light reflected for each scene portion and providing an electrical output responsive to the measured light for each portion;
time integrating each electrical output beginning at the initiation of the exposure interval and comparing the so-integrated output with a predetermined film exposure value based upon the film exposure parameters and providing an indication when each time integrated electrical output meets or exceeds the film exposure value; and
closing the shutter when a selected percentile of said indications are provided.

16. The method for operating a camera shutter claimed in claim 15 wherein said selected percentile is the median percentile.

* * * * *